United States Patent [19]
Suzuki

[11] Patent Number: 5,210,945
[45] Date of Patent: May 18, 1993

[54] METHOD OF ASSEMBLY OF A ROTARY SHAFT IN A BALL-BEARING TYPE TURBOCHARGER

[75] Inventor: Osamu Suzuki, Nagoya, Japan
[73] Assignee: NGK Spark Plug Co., Ltd., Nagoya, Japan
[21] Appl. No.: 704,126
[22] Filed: May 22, 1991
[51] Int. Cl.⁵ .............................................. B21D 53/00
[52] U.S. Cl. .................................. 29/889.21; 29/889.2; 29/901
[58] Field of Search .................. 29/889.2, 889.21, 901, 29/428

[56] References Cited
U.S. PATENT DOCUMENTS

| | | | |
|---|---|---|---|
| 2,327,606 | 8/1943 | Saltz | 29/901 |
| 2,403,489 | 7/1946 | Biman | 29/889.2 |
| 4,815,184 | 3/1989 | Johnston | 29/889.2 |
| 4,854,025 | 8/1989 | Oda et al. | 29/889.2 |

Primary Examiner—Irene Cuda
Attorney, Agent, or Firm—Cooper & Dunham

[57] ABSTRACT

In an assembly method of the rotary shaft in use for a ball-bearing type turbocharger, there includes steps of inserting an inner race of the first ball bearing into a rotary shaft to locate it in proximity of a turbine impeller before disposing the rotary shaft into the center housing; inserting a sleeve into the rotary shaft before mounting the second ball bearing on the rotary shaft; applying a compensation force to the inner race of the first ball bearing by way of the sleeve so as to bring one side of the inner race into a tight engagement with a boss portion of the turbine impeller, a magnitude of the force falling within a range from 20% to 120% of an axial force applied in the direction along the rotary shaft when the compressor impeller is secured to the rotary shaft by tightening the screw nut; releasing the compensation force from the inner race of the first ball bearing, and carrying out imbalance-correction of the turbine impeller prior disposing into the center housing.

8 Claims, 6 Drawing Sheets

METHOD OF ASSEMBLY OF A ROTARY SHAFT IN A BALL-BEARING TYPE TURBOCHARGER

BACKGROUND OF THE INVENTION

1. Field of the Invention

The invention relates to an assembly method of a rotary shaft in use for a ball-bearing type turbocharger which is intended to leave out complicating procedures necessary when carrying out imbalance-correction of a turbine impeller to readily facilitate the imbalance-correction, and contribute to an improved production with an extended period of service life.

2. Description of Prior Art

In a ball-bearing type turbocharger there is a rotary shaft rotatably supported by first and second ball bearings. To one end of the rotary shaft, a turbine impeller is securely connected through its boss portion, and to the other end of the rotary shaft, a compressor impeller is connected by a nut securing the compressor impeller against its removal.

Prior to disposing the rotary shaft into the ball-bearing type turbocharger, an inner race of the first ball bearing is forcibly inserted to the rotary shaft by press-fit until one side of the inner race engages with the boss portion of the turbine impeller. Subsequent to the press-fitting procedure, an imbalance-correction of the turbine impeller is carried out with the inner race of the first ball bearing inserted to the rotary shaft.

After press-fitting the inner race of the first ball bearing, however, it becomes difficult to insure a tight engagement between an entire surface of one side of the inner race and that of the boss portion of the turbine impeller due to spring-back of the inner race, although one side of the inner race temporarily engages with the boss portion of the turbine impeller at the time of press-fitting the inner race of the first ball bearing. This makes it impossible to maintain a perpendicular relationship between a center line of the rotary shaft and a ball-rolling plane of the inner race of the first ball bearing. Then, an amount of imbalance of the turbine impeller is measured in an futile attempt to carry out the imbalance-correction with a center line of the inner race out of place from that of the rotary shaft.

At the time when the rotary shaft is disposed within the turbocharger, the inner race normally moves to an intended position in which the inner race engages its one side with the boss portion of the turbine impeller so as to accumulate the amount of imbalance of the turbine impeller too much to correct once the rotary shaft is disposed in the turbocharger.

Therefore, it is an object of this invention to provide an assembly method of a rotary shaft in use for a ball-bearing type turbocharger which is capable of facilitating to carry out imbalance-correction of a turbine impeller, and contributing to an improved production with an extended period of service life.

SUMMARY OF THE INVENTION

According to the present invention, there is provided a ball-bearing type turbocharger which comprises a turbine housing in which a turbine impeller is disposed to be driven by exhaust gas emitted from an internal combustion engine; a compressor housing in which a compressor impeller is disposed to compress intake air for the internal combustion engine; a center housing air-tightly connected between the turbine housing and the compressor housing, the center housing having a rotary shaft, one end of which is connected to the turbine impeller while the other end is connected to the compressor impeller, and supported by first and second ball bearings, the other end of the rotary shaft extending through the compressor impeller and having a screw nut to secure the compressor impeller against removal; a sleeve enclosing the rotary shaft between the first and second ball bearings to position the two bearings in place; an assembly method of the rotary shaft comprising the steps of inserting inner and outer races of the first ball bearing onto the rotary shaft to locate the races in proximity to the turbine impeller before disposing the rotary shaft into the center housing; inserting the sleeve into the rotary shaft before mounting the second ball bearing on the rotary shaft; applying a compensation force to one end of the inner race of the first ball bearing by way of the sleeve so as to bring one side of the inner race into a tight engagement with the boss portion of the turbine impeller, a magnitude of the compensation force falling within a range from 20% to 120% inclusive of an axial force applied in the direction along the rotary shaft when the compressor impeller is secured to the rotary shaft by tightening the screw nut at the time of assemblage; releasing the compensation force from the inner race of the first ball bearing and carrying out imbalance-correction of the turbine impeller to form a combination body; and disposing the combination body into the center housing.

Since the compensation force is applied to one end of the inner race of the first ball bearing by way of the sleeve at a magnitude in which the compensation force falling within a range from 20% to 120% (preferably 80%~120%) of an axial force applied in the direction along the rotary shaft when the compressor impeller is secured to the rotary shaft by tightening the screw nut at the time of assemblage, one side of the inner race is brought into a tight engagement with the boss portion of the turbine impeller. This enables to keep a perpendicular relationship between a center line of the rotary shaft and a ball-rolling plane of the inner race of the first ball bearing. This obviates a possibility of accumulating a considerable amount of imbalance of the turbine impeller when the rotary shaft is disposed in the turbocharger, and thus making it possible to secondarily carry out the imbalance-correction with ease after the rotary shaft is disposed in the turbocharger.

This holds true when an elongated sleeve is employed instead of the positioning sleeve. In this instance, the inner race is pushed to engage its one side tightly with the boss portion of the turbine impeller at a magnitude in which the compensation force falling within a range from 20% to 120% (preferably 80%~120%) of an axial force applied in the direction along the rotary shaft when the compressor impeller is secured to the rotary shaft by tightening the screw nut at the time of assemblage.

Various other objects and advantages to be obtained by the present invention will appear in the following description and in the accompanying drawings.

DETAILED DESCRIPTION OF THE EMBODIMENTS

Figure 1:
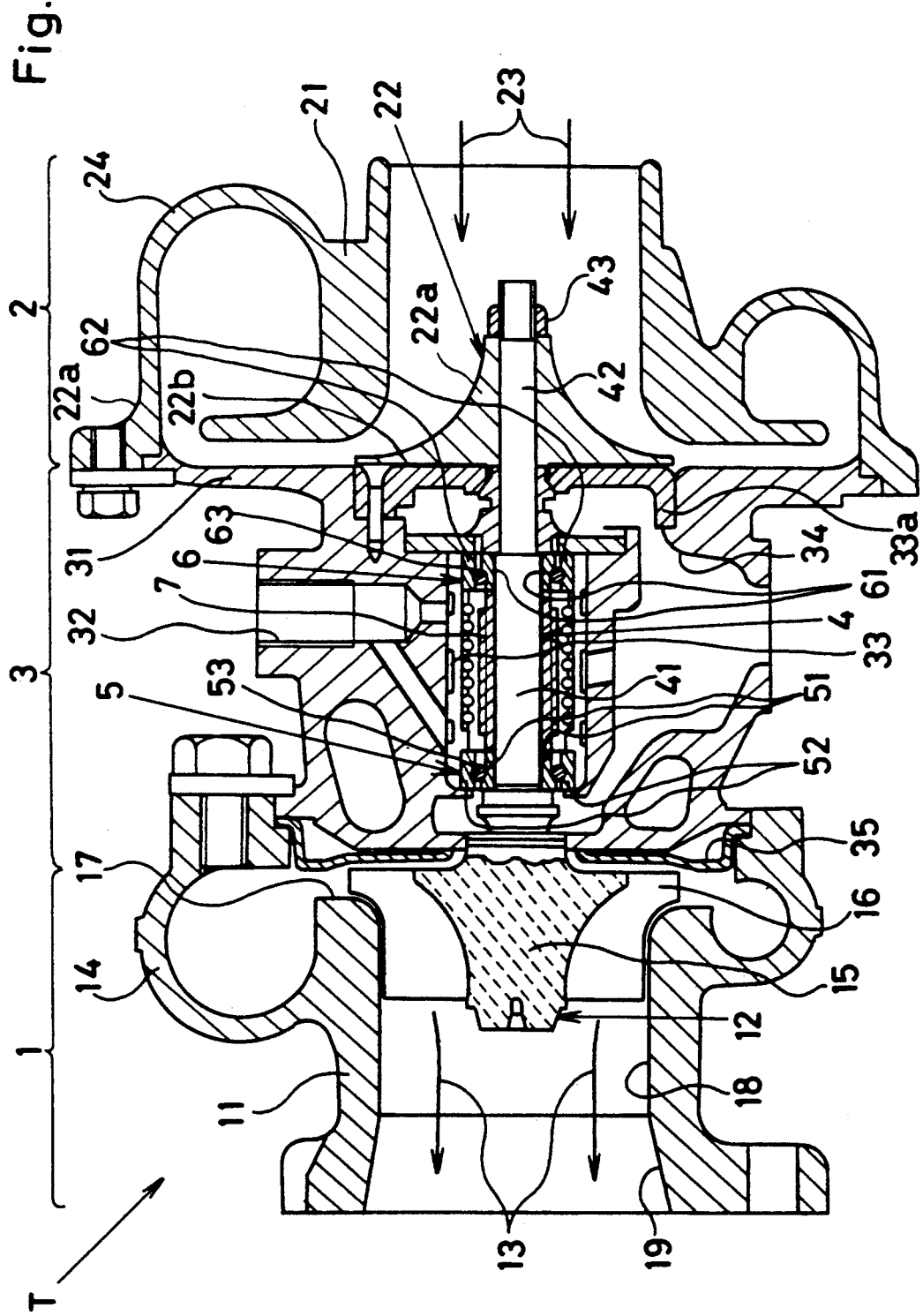
FIG. 1 is a longitudinal cross sectional view of a turbocharger with assemblage complete according to an embodiment of the invention.

Referring firstly to FIG. 1 which shows a turbocharger (T) in use for an internal combustion engine, the turbocharger (T) has a turbine 1, a compressor 2 and a center housing mechanism 3 located between the turbine 1 and the compressor 2. The turbine 1 which is made of high nickel cast iron has a cylindrical turbine housing 11 which encloses a turbine impeller 12, thickness and diameter of which in turn measure 1.2 mm and 55.5 mm. The turbine housing 11 has a scroll passage 14 which is adapted to introduce exhaust gas 13 into the turbine impeller 12 located within the turbine housing 11. The exhaust gas 13 emitted from the internal combustion engine has a temperature of 400° C.~1100° C., and causes to rotate the turbine impeller 12 to rotate at the speed of $10^4 \sim 2 \times 10^4$ rpm. The exhaust gas 13, thus rotating the turbine impeller 12, is adapted to escape from an outlet opening 19 by way of a nozzle 17 and a shroud 18 which are continuously connected to an end of the outlet opening 19. The turbine impeller 12, which is integrally connected to a rotary shaft 4 as described hereinafter, is made of light-weight ceramic material with silicon nitride as a main component, and consisting of a boss portion 15 and a plurality of blades 16 radially extending from the periphery of the boss portion 16.

On the other hand, the compressor 2 has a cylindrical compressor housing 21 which encloses a compressor impeller 22 to compress intake air for the internal combustion engine. The compressor housing 21, which is made of aluminum-based alloy, encloses a compressor impeller 22, and has a scroll 24 to introduce the compressed intake air 23 (1.5~3 atm.) into a carburetor (not shown). The compressor impeller 22 is made of aluminum, and consisting of a hub 22a and rear-raised type blades 22b in an aim to obtain sufficient super-charging pressure by selecting a wide range of rpm.

A center housing mechanism 3 has a center housing 31, one open end of which is air-tightly connected to the turbine housing 11 through a heat shield plate 35 which is arranged to interrupt heat transmission toward the center housing 31. While the other open end of the center housing 31 is air-tightly connected to the compressor housing 21 through a support plate 33a. The center housing 31 encases the rotary shaft 4 laterally supported by first and second ball bearings 5, 6 each of which has heat-resistant property. Each of the ball bearings 5, 6 is single-row angular type, and consists of inner races 51, 61, outer races 52, 62 and eight balls 53, 63 located between each of the inner and outer races. Each of inner and outer diameters of the bearings 5, 6 measures 9 mm and 23 mm (tolerance: class 4 by JIS). Employment of the ball bearings 5, 6 enables the turbocharger (T) to achieve a quick response in comparison to the response that can be achieved with floating type of bearings.

A sleeve 7 is secured to the rotary shaft 4 to be located between the first and second ball bearings 5, 6 so as to position the inner races 51, 61 of the bearings 5, 6 in place. More particularly, the rotary shaft 4 has a slight drop in diameter at its middle portion to include a diameter-enlarged left-half 41 and a diameter-reduced right-half 42. One end of the rotary shaft 4 extends into the turbine housing 11 by piercing the heat shield plate 35 so as to integrally connect the turbine impeller 12. In this instance the turbine impeller 12 is assembled to provide a slight clearance (1.5 mm) between the heat shield plate 35 and a rear edge of the turbine impeller 12.

Meanwhile, the other end of the rotary shaft extends into the turbine housing 11 by piercing the support plate 33a to secure the compressor impeller 22. The right extremity of the rotary shaft 4 somewhat extends beyond the hub of the compressor impeller 22, and provided with a male thread 44. A screw nut 43 is tightened to the male thread 44 by a torque of e.g. 1 Kg.m so as to secure the compressor impeller 22 against removal.

At this time, the tightening torque of the nut 43 causes the rotary shaft 4 to establish a tensile force referred to as an axial force according to the invention.

Into the center housing 31, is an oil supplying mechanism incorporated which has a supply inlet 32, a filter damper 33 and an oil outlet 34. Oil passing through the bearings 5, 6 eacapes from the outlet 34 to an oil pan (not shown), and circulates from the oil pan to the bearings 5, 6 for lubrication.

Figure 2:
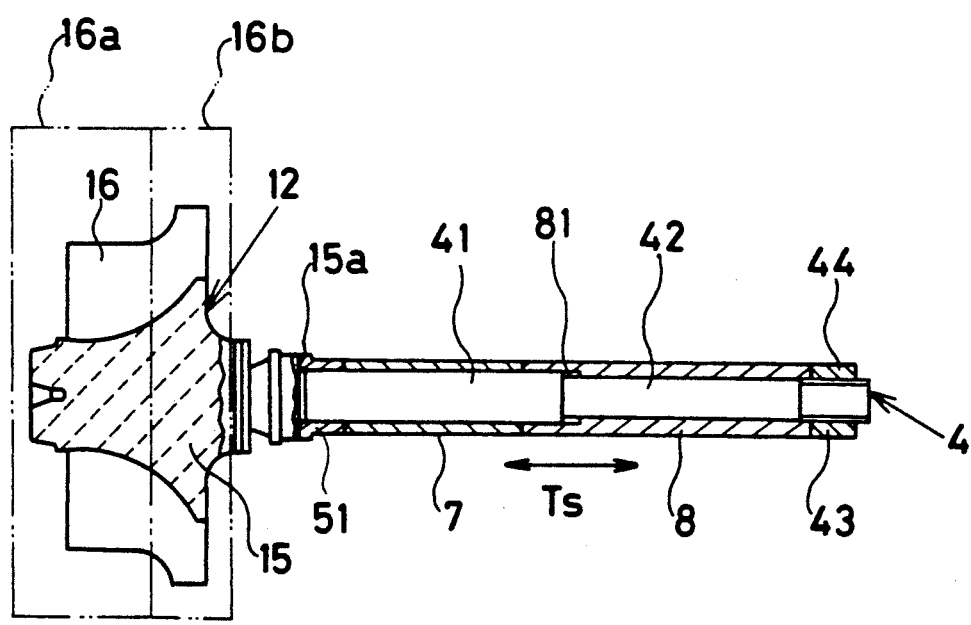
FIG. 2 is an explanatory cross sectional view of a rotary shaft when a sleeve is secured to the rotary shaft.

As shown in FIG. 2, a cure sleeve 8 is prepared, an outer diameter of which is the same as that of the sleeve 7, while an inner diameter of the cure sleeve 8 is the same as an outer diameter of the diameter-reduced right-half 42. A left end of the cure sleeve 8, however, is somewhat enlarged at its inner diameter to form an end play space 81 so as to cope with the middle step portion between the left-half 41 and the right-half 42.

The following procedures are taken prior to the rotary shaft 4 being assembled to the turbocharger (T).

(1) By employing press-fit force 200 Kg, the inner and outer races 51, 52 of the first ball bearing 5 and the sleeve 7 are in turn forcibly fit to the rotary shaft 4 with the press-fit allowance as 5 $\mu \sim 10$ $\mu$. However, for clarity, the outer race 52 is omitted from FIGS. 2 and 3.

(2) The cure sleeve 8 is fit to the rotary shaft 4 from the side of the right-half 42 in series relationship with the sleeve 7 as shown in FIG. 2. Then, the nut 43 is tightened to the male thread 44 by a compensation torque (compensation force) of 0.8 Kg.m which is equivalent to 80% of the axial force applied to the same nut 43 when the rotary shaft 4 is secured to the turbocharger (T). In this instance, the compensation torque may preferably be within a range from 80% to 120% of the axial force. By way of the sleeves 8, 7, the compensation torque of the nut 43 causes the inner race 51 to push against the boss portion 15 to bring one side of the inner race 51 into a tight engagement with a rear end surface 15a of the boss portion 15, and thus keeping a perpendicular relationship between a ball-rolling plane of the inner race 51 and a center line of the rotary shaft 4.

Simultaneously, the compensation torque causes the rotary shaft 4 to establish a tensile stress as a counteraction in the direction of arrow (Ts) shown in FIG. 2.

Figure 2A:
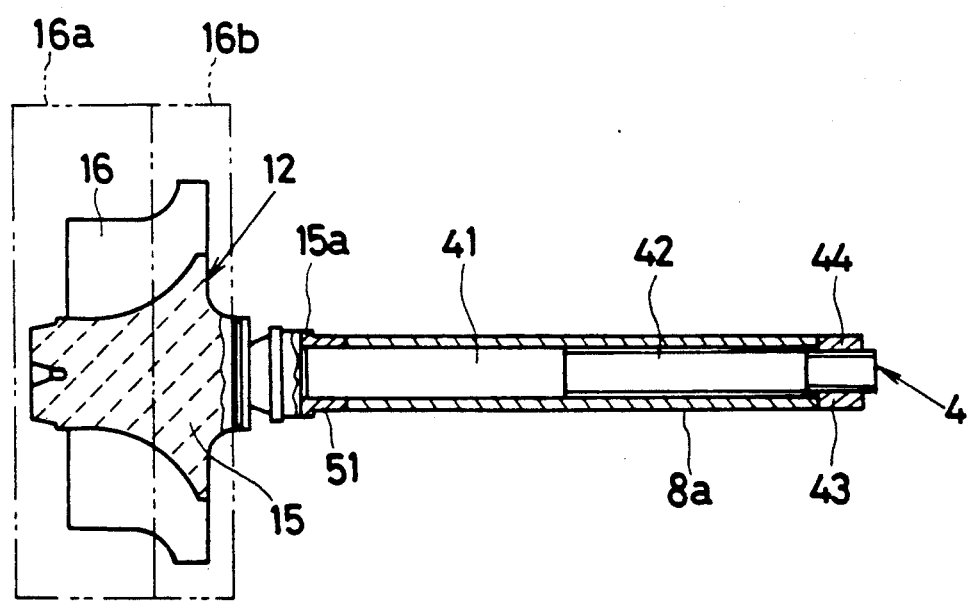
FIG. 2a is a view similar to FIG. 2 according to a modified form of the invention when an elongated sleeve is employed instead of a sleeve and a cure sleeve.

In this instance, instead of the cure sleeve 8 an elongated sleeve 8a may be used with the sleeve 7 removed as shown in FIG. 2a. This is particularly convenient when the sleeve 7 is not per se required to the rotary shaft 4 in such cases in which a distance between the ball bearings 5, 6 is relatively short, otherwise the inner race 51 is axially elongated.

In each of the above two instances, instead of tightening the screw nut 43 a compensation force which is equivalent to the compensation torque may be axially applied to the rotary shaft 4 in the tensile direction from the turbine impeller 12 toward the compressor impeller 22 with the sleeve 8 (8a) kept stationary.

Figure 3:
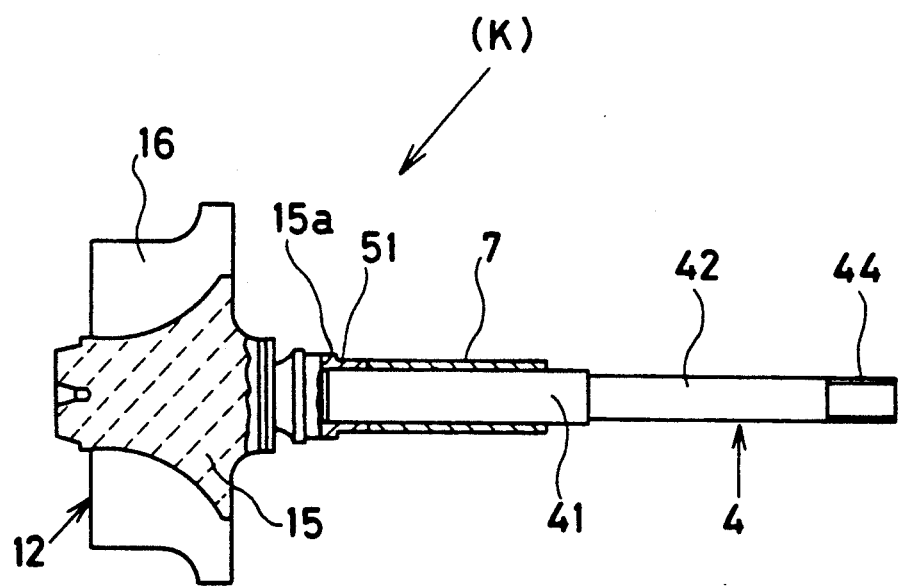
FIG. 3 is a view similar to FIG. 2, but a cure sleeve is removed.

(3) The screw nut 43 is loosened to release the compensation torque, and subsequently removing the cure sleeve 8 from the rotary shaft 4. On the other hand, the blades 16 of the turbine impeller 12 are scraped to adjust their weight so as to carry out imbalance-correction so as to form a combination body (K) as shown in FIG. 3.

At the time of carrying out the imbalance-correction, the perpendicular relationship between the inner race 51 and the rotary shaft 4 to prevents the amount of the imbalance from being unintentionally accumulated, thus making it easy to secondarily correct the imbalance when the rotary shaft 4 is disposed in the turbocharger.

(4) The combination body (K), thus provided, is disposed in the center housing 31 by carrying it from the turbine housing 11, and the inner and outer races 61, 62 of the second ball bearing 6 is secured to the rotary shaft 4. Then, the compressor impeller 22 is connected to the right end of the rotary shaft 4 by tightening the screw nut 43 against the hub portion 22a to secure the compressor impeller 22 against its removal.

A test piece combination and a couterpart combination are each assembled in accordance with the following procedures to carry out a vibration-tolerance experiment.

Figure 4:
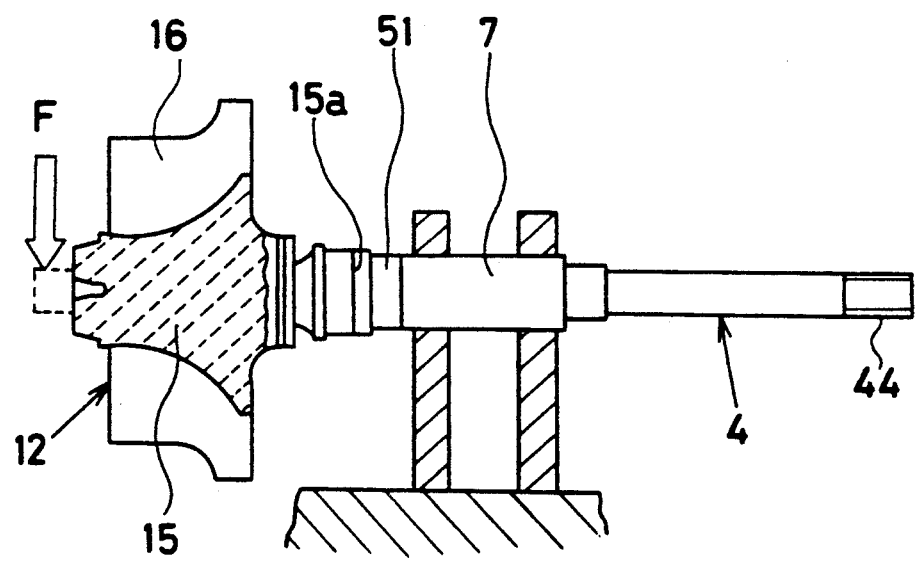
FIG. 4 is an explanatory elevational view of the rotary shaft which is subjected a bending load at the time of vibration experiment, but a turbine impeller is sectioned.
Figure 5:
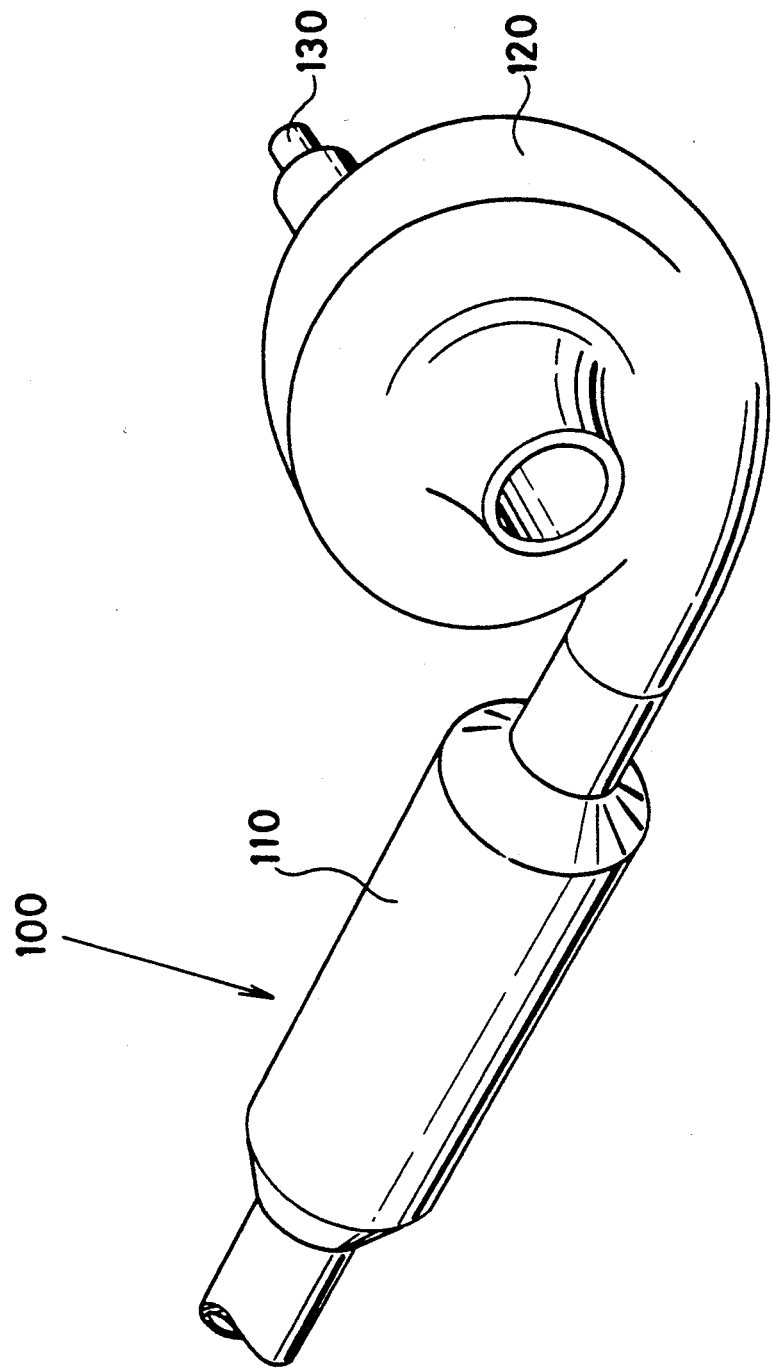
FIG. 5 is a perspective view of a high temperature revolution test device employed by the vibration experiment.

(i) By employing press-fit force 200 Kg, the inner the outer races 51, 52 of the first ball bearing 5 and the sleeve 7 are in turn forcibly fit to the rotary shaft 4 with a press-fit allowance as 5 $\mu \sim$ 10 $\mu$. However, for clarity the outer race 61 is omitted from FIG. 4.

(ii) A bending load (F), a magnitude of which ranges from 2 kg to 10 Kg, is purposely applied to the turbine impeller 12 for ten seconds with the sleeve 7 fit to the rotary shaft 4. After removing the bending load (F) from the turbine impeller 12, the combination body is directly subjected to procedures (vi) and (v) so as to form the counterpart combination.

(iii) After removing the bending load (F), the nut 43 is tightened to the male thread 44 by the compensation torque of 0.8 Kg.m which is equivalent to 80% of the axial force as carried out by the step (2). This is referred to as a nut-tightening operation hereinafter.

(iv) The screw nut 43 is loosen to remove the cure sleeve 8 from the rotary shaft 4 so as to carry out the imbalance-correction of the turbine impeller 12 as implimented by the step (3).

(v) The test piece combination and the counterpart combination thus assembled are each disposed within the corresponding turbochargers in the same manner as done by the step (4).

Meanwhile, a high temperature revolution test device 100 has a turbine scroll 120 provided with a vibration pick-up 130. To the turbine scroll 120, is a burner nozzle 110 directly connected. The turbochargers each carrying the test piece combination and the counterpart combination, are alternately loaded into the test device 100.

A vibrational magnitude (G) of the rotary shaft 4 is measured as shown in Table 1 when the rotary shaft 4 reaches to $4 \times 10^4$ rpm with the temperature of the exhaust gas passing through the scroll passage 14 as 900° C.

TABLE 1

|  | bending load (Kg) | vibrational magnitude (G) |
|---|---|---|
| test piece combination | 2 | 1.5 |
|  | 5 | 1.5 |
|  | 10 | 2.0 |
| counterpart combination | 2 | 3.5 |
|  | 5 | 5.0 |
|  | 10 | 8.0 |

It has been found that the desired vibrational magnitude (G) is less than 3 (G) considering torlerable level of noise and endurability of the ball bearings. In the test piece combination assembled in accordance with the steps of the invention, even bending load (F) causes no extraordinary amount of increase of imbalance as shown in Table 1.

Further experiment is carried out by dividing the turbine impeller 12 into two parts, a front half 16a and a rear half 16b.

Table 2 shows how an amount of imbalance of the front half 16a of the turbine impeller 12 changes as it in turn undergoes the bending load (F) and the nut-tightening operation. In this instance, the magnitude (2 kg) of the bending load (F) is imposed on the turbine impeller 12 in the same manner as in step (ii).

TABLE 2

| amount of imbalance before imposing bending load (mg) | amount of imbalance after imposing bending load (mg) | amount of imbalance after nut-tightening operation (mg) |
|---|---|---|
| 2.0 | 18.0 | 2.8 |
| 2.0 | 21.0 | 3.2 |

Table 3 shows how an amount of imbalance of the rear half 16b of the turbine impeller 12 changes as it in turn undergoes the bending load (F) and the nut-tightening operation. In this instance, the magnitude (5 Kg) of the bending load (F) is imposed on the turbine impeller 12 in the same manner as in step (ii).

TABLE 3

| amount of imbalance before imposing bending load (mg) | amount of imbalance after imposing bending load (mg) | amount of imbalance after nut-tightening operation (mg) |
|---|---|---|
| 5.0 | 78.0 | 7.0 |
| 5.0 | 61.0 | 8.0 |

As readily understood from the Tables 2, 3, each amount of imbalance of the front half 16a and the rear half 16b of the turbine impeller 12 increases to more than nine or ten-fold compared to that before undergoing the bending load (F). After the nut-tightening operation, each amount of imbalance of the front half 16a and the rear half 16b, however, is substantially adjusted to within two-fold of the imbalance before undergoing the bending load (F). This means that since the inner race 51 is subjected to the axial force again at the time when the combination body (K) is incorporated into the turbocharger (T), the amount of imbalance decreases to that after undergoing the nut-tightening operation. Thus makes it possible to easily adjust the amount of imbalance with the rotary shaft incorporated into the turbocharger.

Table 4 shows each amount of imbalance of the front half 16a and the rear half 16b of the turbine impeller 12 changes depending on the compensation force as it in turn undergoes the bending load (F) and the nut-tightening operation.

TABLE 4

| percentage of amount of axial force imbalance % | | amount of imbalance before imposing bending load (mg) | amount of imbalance after imposing bending load (mg) | amount of imbalance after nut-tightening operation (mg) |
|---|---|---|---|---|
| 30 | front 16a | 4.0 | 20.0 | 7.2 |
|    | rear 16b  | 4.0 | 59.0 | 10.1 |
| 50 | front 16a | 3.0 | 19.0 | 4.7 |
|    | rear 16b  | 3.0 | 57.0 | 7.4 |
| 80 | front 16a | 2.0 | 21.0 | 3.2 |
|    | rear 16b  | 5.0 | 61.0 | 8.0 |
| 110 | front 16a | 2.0 | 18.0 | 3.0 |
|    | rear 16b  | 2.0 | 54.0 | 3.5 |

It is found from the Table 4 that the magnitude of the compensation force is preferably within the range from 80% to 120% of the axial force.

It is noted that the second ball bearing may be made of heat-resistant ceramic, and a metallic turbine impeller may be discretely made instead of the ceramic one.

It is further noted that the compressor may causes to super-charge air-fuel mixture instead of the air.

It is appreciated that the tightening force of the screw nut may be at least 1 Kg.m to secure the compressor impeller against its removal.

It is also appreciated that plurality of times of procedure (2) may be adopted to repeatedly push the inner race against the boss portion to bring one side of the inner race into a tight engagement with a rear end surface of the boss portion of the turbine impeller.

As various changes could be made in the above apparatus and methods without departing from the scope of the invention, it is intended that all manners contained in the above description or shown in the accompanying drawings shall be interpreted as illustrative and not in a limitting sense.

What is claimed is:

1. In a method of assembling a ball-bearing type turbocharger which comprises a turbine housing in which a turbine impeller is disposed to be driven by exhaust gas emitted from an internal combustion engine; a compressor housing in which a compressor impeller is disposed to compress intake air for the internal combustion engine; a center housing air-tightly connected between the turbine housing and the compressor housing, the center housing having a rotary shaft which is rotatably supported by first and second ball bearings, one end of the rotary shaft being securely connected to the turbine impeller through a turbine impeller boss portion and the other end of the rotary shaft being connected to the compressor impeller, extending through the compressor impeller, and having a screw nut to secure the compressor impeller against removal; and a sleeve enclosing the rotary shaft between the first and second ball bearings to position the two bearings in place;

the assembly method of the rotary shaft comprising the steps of:

inserting inner and outer races of the first ball bearing onto the rotary shaft to locate the races in proximity to the turbine impeller prior to disposing the rotary shaft in the center housing;

inserting the sleeve onto the rotary shaft prior to mounting the second ball bearing on the rotary shaft;

applying a compensation force axially to the inner race of the first ball bearing by way of the sleeve so as to bring one side of the inner race into a tight engagement with the boss portion of the turbine impeller, a magnitude of the compensation force falling within a range from 20% to 120% inclusive of an axial force applied in the direction along the rotary shaft when the compressor impeller is secured to the rotary shaft by tightening the screw nut at the time of assemblage;

releasing the compensation force from the inner race of the first ball bearing and carrying out imbalance-correction of the turbine impeller to form a combination body; and disposing the combination body into the center housing.

2. An assembly method of the rotary shaft for a ball-bearing type turbocharger as recited in claim 1 wherein the magnitude of the axial force applied to the rotary shaft when the compressor impeller is secured to the rotary shaft by tightening the screw nut at the time of assemblage is at least 1 kg.m.

3. An assembly method of the rotary shaft for a ball-bearing type turbocharger as recited in claim 1 wherein a curve sleeve is inserted onto the rotary shaft in series with the sleeve, and the compensation force is applied by way of the cure sleeve at the time of applying the compensation force.

4. An assembly method of the rotary shaft for a ball-bearing type turbocharger as recited in claim 1 wherein the imbalance-correction is carried out by scraping the turbine impeller.

5. In a method of assembling a ball-bearing type turbocharger which comprises a turbine housing in which a turbine impeller is disposed to be driven by exhaust gas emitted from an internal combustion engine; a compressor housing in which a compressor impeller is disposed to compress intake air for the internal combustion engine; a center housing air-tightly connected between the turbine housing and the compressor housing, the center housing having a rotary shaft which is rotatably supported by first and second ball bearings, one end of the rotary shaft being securely connected to the turbine impeller through a turbine impeller boss portion and the other end of the rotary shaft being connected to the compressor impeller, extending through the compressor impeller, and having a screw nut to secure the compressor impeller against removal;

the assembly method of the rotary shaft comprising the steps of:

inserting inner and outer races of the first ball bearing onto the rotary shaft to locate the races in proximity to the turbine impeller prior to disposing the rotary shaft into the center housing;

applying a compensation force axially to the inner race on the first ball bearing so as to bring one side of the inner race into a tight engagement with the boss portion of the turbine impeller, a magnitude of the compensation force falling within a range from 20% to 120% inclusive of an axial force applied in the direction along the rotary shaft when the compressor impeller is secured to the rotary shaft by tightening the screw nut at the time of assemblage;

releasing the compensation force from the inner race of the first ball bearing and carrying out imbalance-correction of the turbine impeller to form a combination body; and disposing the combination body into the center housing.

6. An assembly method of the rotary shaft for a ball-bearing type turbocharger as recited in claim 5 wherein a magnitude of the axial force applied to the rotary shaft when the compressor impeller is secured to the rotary shaft by tightening the screw nut at the time of assemblage is at least 1 kg.m.

7. An assembly method of the rotary shaft for a ball-bearing type turbocharger as recited in claim 5 wherein an elongated cure sleeve is inserted onto the rotary shaft, and the compensation force is applied by way of the elongated cure sleeve at the time of applying the compensation force.

8. An assembly method of the rotary shaft for a ball-bearing type turbocharger as recited in claim 5 wherein the imbalance-correction is carried out by scraping the turbine impeller to adjust the weight of the turbine impeller.

* * * * *